US011986428B2

(12) United States Patent
Scarlett

(10) Patent No.: US 11,986,428 B2
(45) Date of Patent: May 21, 2024

(54) WHEELCHAIR

(71) Applicant: ROLAPAL LIMITED, Auckland (NZ)

(72) Inventor: Roydon Mark Scarlett, Manukau (NZ)

(73) Assignee: ROLAPAL LIMITED, Takanini (NZ)

( * ) Notice: Subject to any disclaimer, the term of this patent is extended or adjusted under 35 U.S.C. 154(b) by 262 days.

(21) Appl. No.: 17/491,611

(22) Filed: Oct. 1, 2021

(65) Prior Publication Data

US 2023/0105633 A1 Apr. 6, 2023

(51) Int. Cl.
*A61G 5/12* (2006.01)
*A61G 5/10* (2006.01)

(52) U.S. Cl.
CPC .......... *A61G 5/1081* (2016.11); *A61G 5/1059* (2013.01); *A61G 5/1067* (2013.01); *A61G 5/122* (2016.11)

(58) Field of Classification Search
CPC ..... A61G 5/1081; A61G 5/122; A61G 5/1067
See application file for complete search history.

(56) References Cited

U.S. PATENT DOCUMENTS

| | | | | |
|---|---|---|---|---|
| 5,904,398 A * | 5/1999 | Farricielli | A61G 5/0866 | 297/378.12 |
| 6,375,209 B1 * | 4/2002 | Schlangen | A61G 5/045 | 180/907 |
| 6,447,064 B1 * | 9/2002 | Mundy | A61G 5/1081 | 297/313 |
| 6,979,010 B1 * | 12/2005 | Kwapis | A61G 5/1054 | 280/42 |
| 10,945,901 B2 * | 3/2021 | Scarlett | A61G 5/122 | |
| 11,259,974 B1 * | 3/2022 | Whelan | A61G 5/1059 | |
| 2003/0230868 A1 * | 12/2003 | Beumer | A61G 5/1081 | 280/250.1 |
| 2006/0237943 A1 * | 10/2006 | Lai | A61G 5/1081 | 280/250.1 |
| 2009/0072105 A1 * | 3/2009 | Cramer | A61G 5/12 | 297/440.2 |
| 2010/0276975 A1 * | 11/2010 | Cooper | A61G 5/122 | 297/354.1 |
| 2012/0146301 A1 * | 6/2012 | Horvath | A61G 5/1067 | 280/47.4 |
| 2012/0223560 A1 * | 9/2012 | Hetzel | A61G 5/12 | 297/285 |
| 2019/0216662 A1 * | 7/2019 | Farricielli | A61G 5/124 | |

* cited by examiner

*Primary Examiner* — Minnah L Seoh
*Assistant Examiner* — Marlon A Arce
(74) *Attorney, Agent, or Firm* — Emerson Thomson Bennett; Daniel A. Thomson

(57) ABSTRACT

A wheelchair is described herein, including wheels, a support frame that engages with the wheels, a seat base fitted to the support frame, and suspension between the frame and the seat base, wherein the seat base is adapted to move with respect to the support frame when a human occupant is seated on the seat base such that the suspension dampens body weight force between the seat base and the support frame.

11 Claims, 6 Drawing Sheets

WHEELCHAIR

FIELD

The present teaching relates to a wheelchair incorporating suspension.

BACKGROUND

It is known for some wheelchair users to have muscular spasms when travelling over bumps or an uneven surface generally. These are a reflex response to vibrations running up through the chair to the occupant. As a result the occupant may thrash their body, putting strain on the chair and therefore cause premature wear and tear. Further, some wheelchair users are known to forcefully bang their heads against the wheelchair's backrest, or push their feet against the wheelchair's foot rests and drive their back into the backrest. These movements also cause undue strain on the wheelchair and premature wear and tear.

OBJECT

It is an object of aspects of the present teaching to go some way towards addressing the above problem. While this applies to certain aspects, it should be understood that the object of the present teaching per se is simply to provide the public with a useful choice. Therefore, any objects, advantages or benefits applicable to present teaching should not be taken as a limitation on any claim expressed more broadly.

SUMMARY

A wheelchair comprising wheels;

a support frame that engages with wheels;

a seat base fitted to the frame; and suspension between the frame and base;

characterised in that the base is adapted to move with respect to the frame when a human occupant is seated on the base such that the suspension dampens body weight force between the base and frame.

Optionally the seat base is detachably fitted to the support frame.

Optionally a plurality of clamps are fitted to the support frame, at least some of which have locking levers that pivot to lock the base on the frame.

Optionally wherein the seat base includes at least one rear saddle, at least two connector tabs and at least one front saddle, all engaged with the support frame.

Optionally each connector tab has a pin that engages a slot of corresponding clamp that is in turn secured to the frame.

Optionally the front saddle is substantially rigid to limit the movement of the seat base.

Optionally the rear saddle is resilient such that at least the rear of the seat base can move up and down on the rear saddle with respect to the support frame.

Optionally a backrest is secured to the frame by way of a set of lever arms at each side, each set comprising one lever arm secured to the back rest (directly or indirectly) and another lever arm secured to the frame (directly or indirectly), for each set at least one of the lever arms is adapted to pivot with respect to the other to enable adjustment of incline of the backrest when an occupant of the seat presses their back against the backrest.

Optionally for each set one of the lever arms is fastened to the backrest by way of a bracket and the other is fastened to the support frame by way of a clamp.

Optionally the backrest is also secured to the support frame (directly or indirectly) by a damper at each side, each damper comprising a piston that retards recline of the backrest to absorb bodyweight or muscle generated wear and tear force on the frame as the backrest moves to a recline position.

Optionally in each case the damper comprises a spring that tensions when the backrest moves to the recline position to retard the recline.

Optionally in each case the damper comprises a housing around the piston, the housing being adapted to move back and forward with respect to the piston when the backrest reclines and subsequently moves to a non-reclined position.

Optionally in each case the piston comprises a pin outside the housing, arranged such that the pin engages a clamp that in turn secures the damper to the support frame.

Optionally in each case the piston's pin has been slid into an upwardly opening track.

DRAWINGS

The present teachings are described hereinafter with reference to the accompanying drawings.

Figure 3:
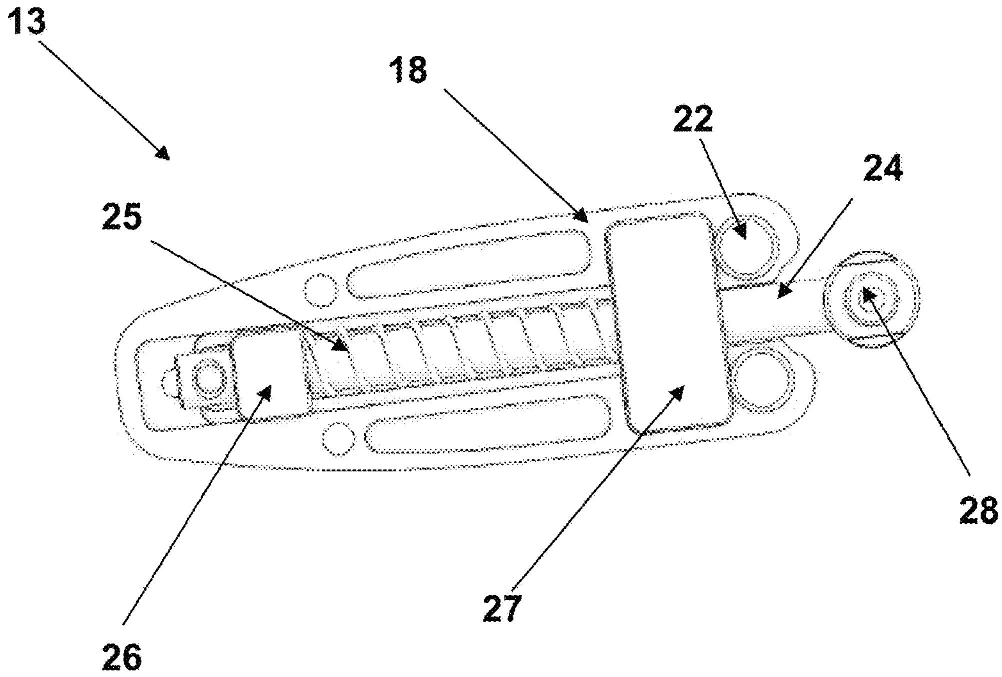
Figure 4:
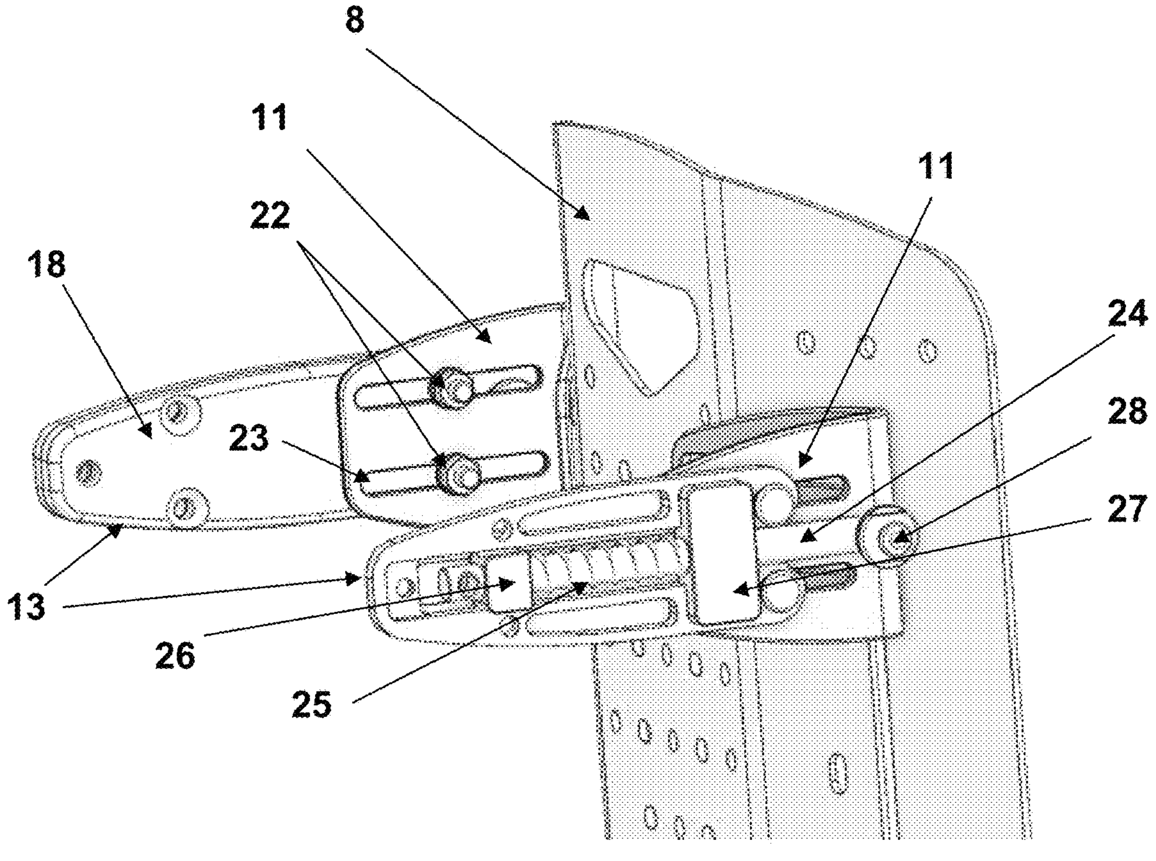
Figure 5:
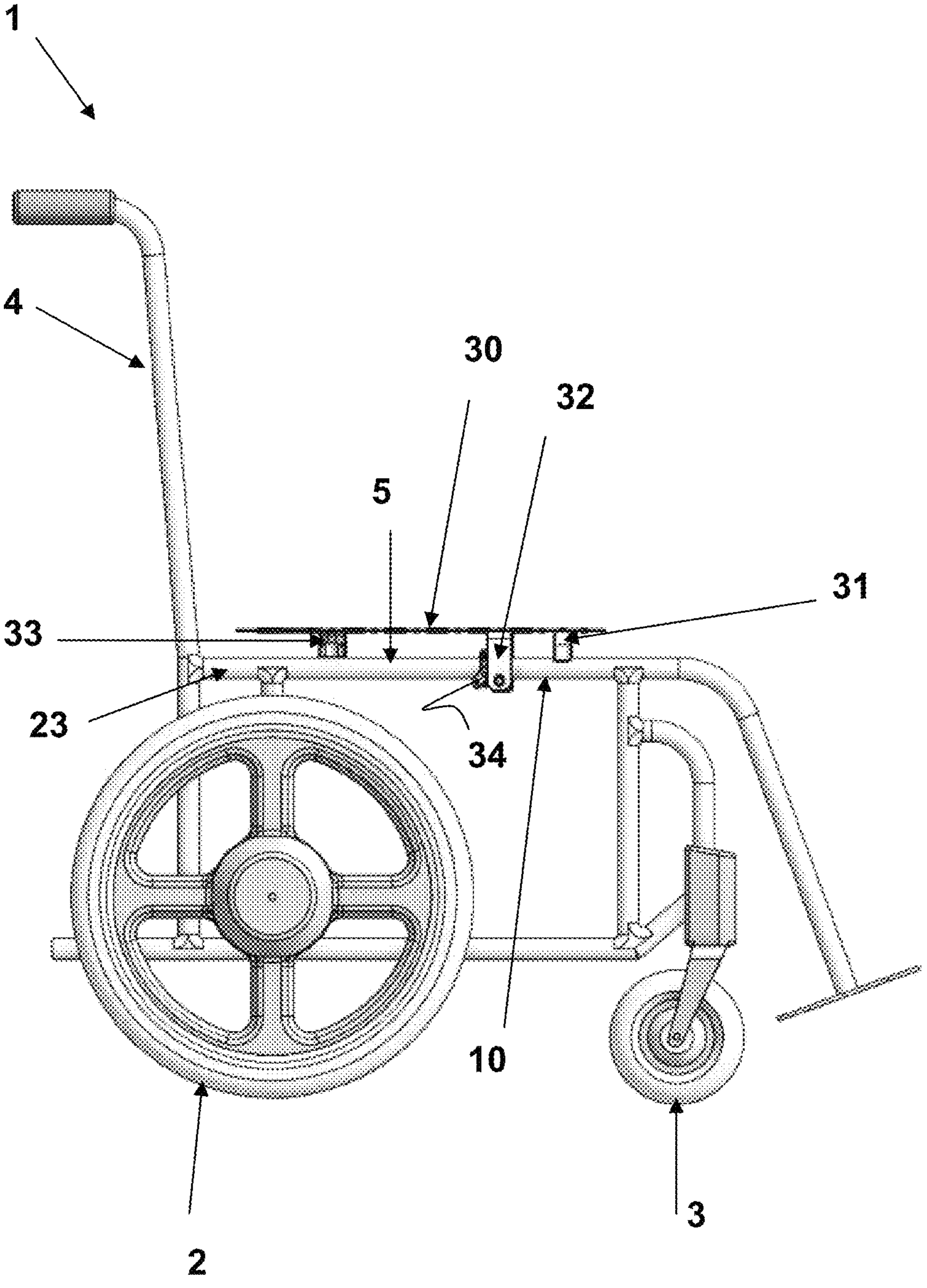
Figure 6:
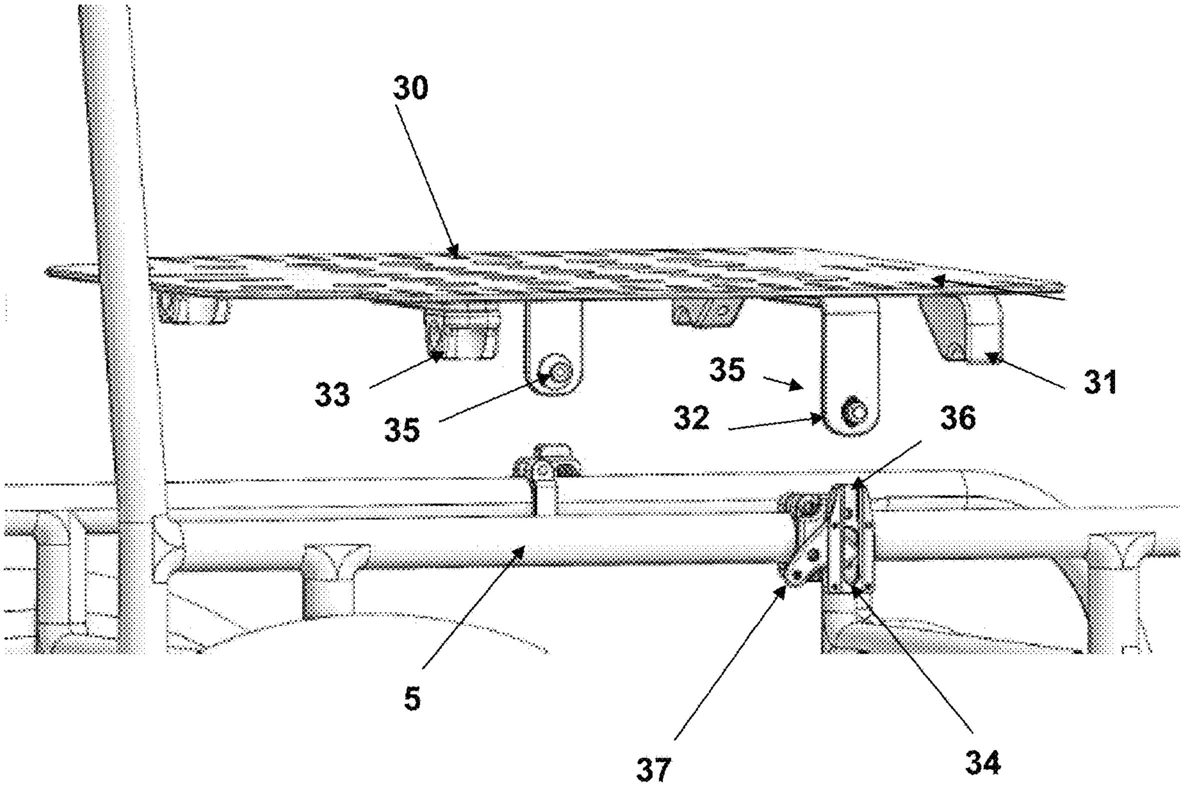
Figure 7:
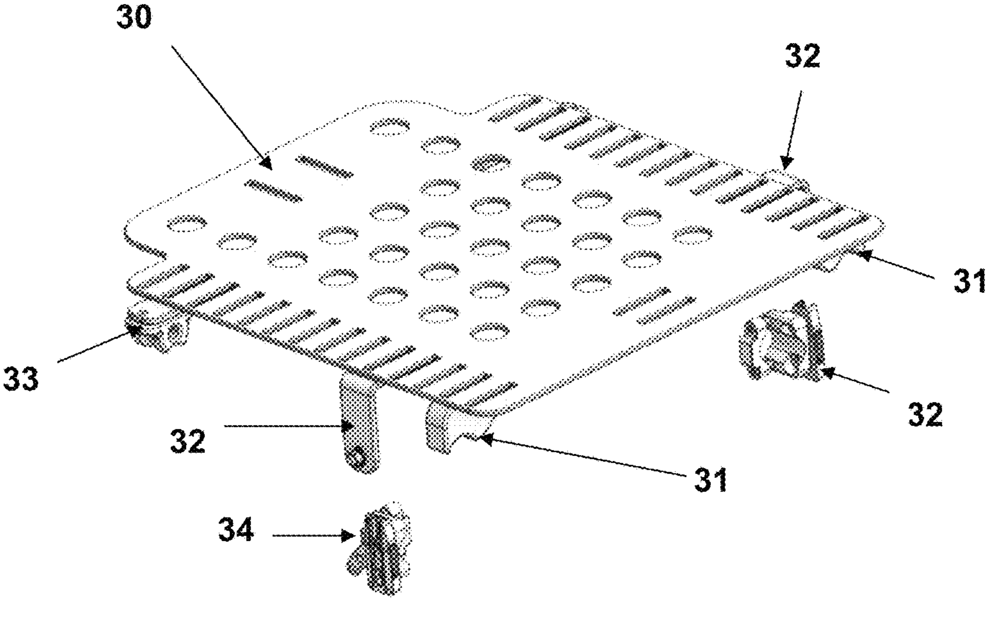
Figure 8:
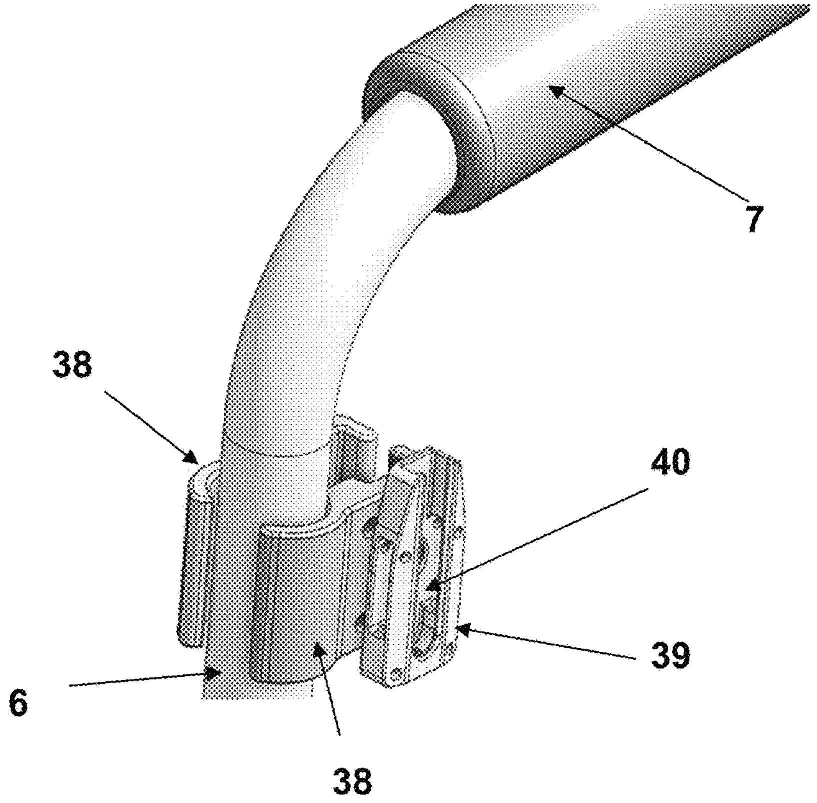
Figure 9:
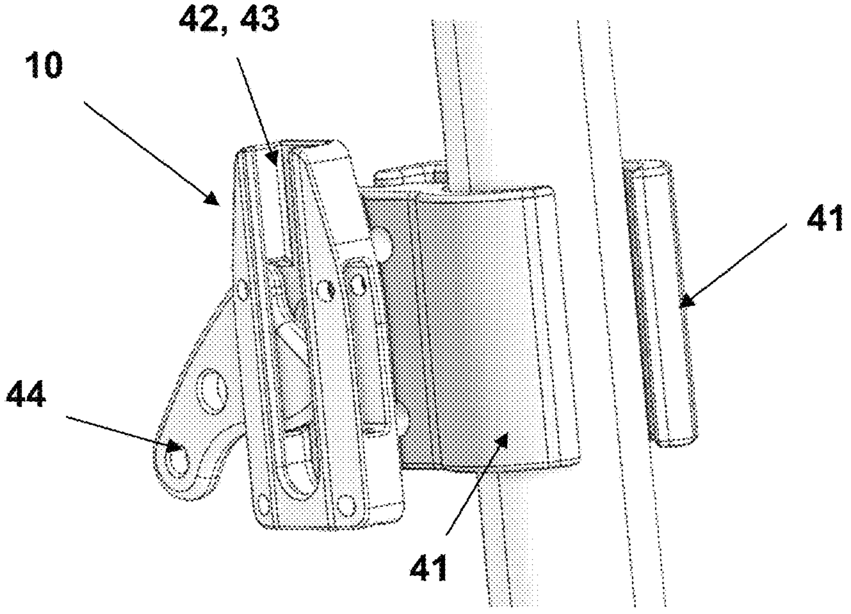

FIG. 3 a side cross-sectional view of a damper forming part of the wheelchair;

FIG. 4 is an isometric part cross-sectional view illustrating how the damper relates to the backrest;

FIG. 5 is a side view of the wheelchair partially assembled;

FIG. 6 is an isometric view of a base plate and seat frame forming part of the wheelchair, in the process of being assembled;

FIG. 7 is a isometric view of the seat base plate;

FIG. 8 is an isometric view of a clamp used to secure the wheelchair's backrest to its frame; and FIG. 9 is an alternative isometric view of the clamp.

DETAILED DESCRIPTION

Figure 1:
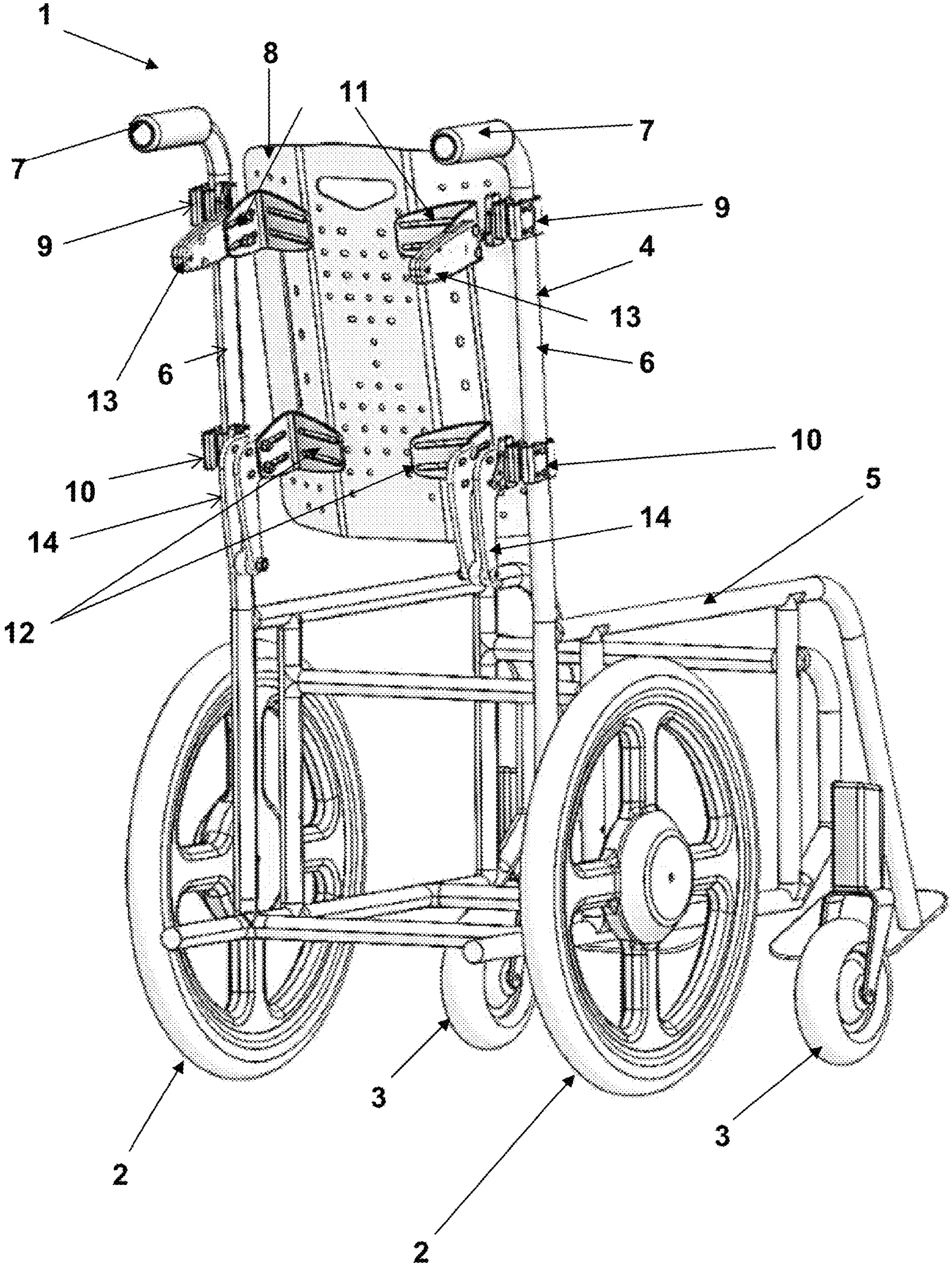
FIG. 1 is an isometric view of a wheelchair, partially assembled.

Referring to FIG. 1, the wheel chair 1 has a pair of large rear wheels 2, a pair of smaller swivelling front wheels 3, a support frame comprising a backrest frame 4 and a seat frame 5. These frames 4, 5 may or may not be integral. The wheels engage the support frame; they connect to it directly. As shown, the backrest frame 4 has a pair of spaced uprights 6 that turn over at their upper end to provide handles 7. The uprights 6 support a plate like backrest 8.

Each upright 6 is fitted with an upper clamp 9 and a lower clamp 10, and each side of the backrest 8 is fitted with upper and lower L-brackets 11, 12. Each upper clamp 9 is rigidly but adjustably connected to the frame 4, and each upper bracket 11 is rigidly but adjustably connected to the backrest 8. Both are connected to a damper 13. Further, each lower clamp 10 is rigidly but adjustably connected to the frame 4, and each lower L-bracket 12 is rigidly but adjustably connected to the backrest 8. As shown, each lower clamp 10 is connected to a corresponding one of the lower L-brackets 12 by way of a lever set 14.

Figure 2:
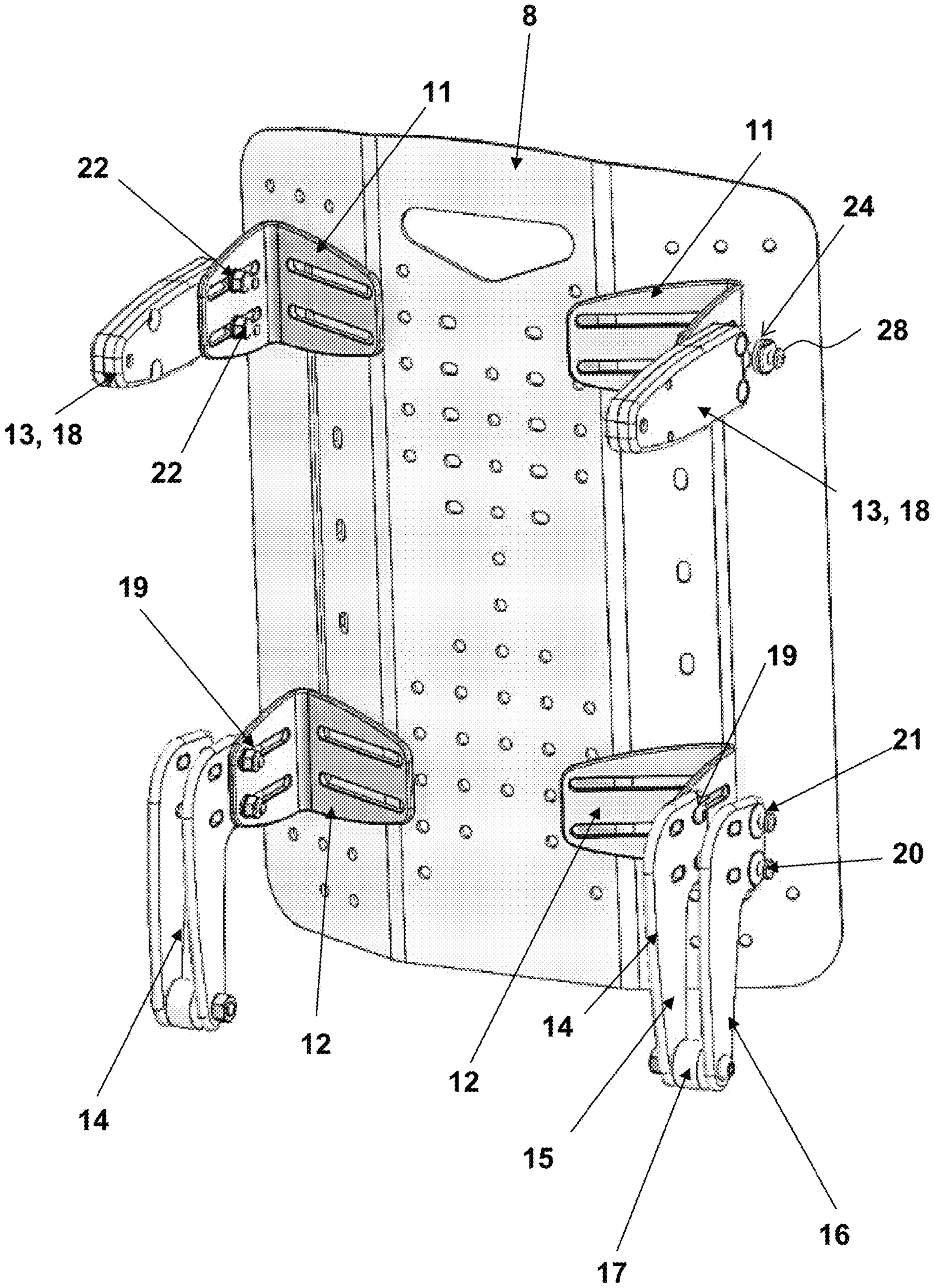
FIG. 2 is an isometric view of backrest forming part of the wheelchair.

Referring to FIG. 2, each lever set 14 comprises an inside lever arm 15 and an outside lever arm 16. The top of each inside lever arm 15 is rigidly but adjustably fixed to a respective lower L-bracket 12 by bolts 19. The top of each outside bracket is fixed to a respective lower clamp 10 (the clamps 10 are shown in FIG. 1) by one or more pins, the position of which is indicated at labels 20 and 21. The lever arms 15, 16 are connected to one another at their lower end by pivot pin 17. The arrangement is such that at least one or other of the levers 15, 16 can pivot about the pin 17 with respect to the other.

Still with FIG. 2, each damper's housing 18 is rigidly but adjustably fixed to the corresponding upper L-bracket 11 by bolts 22. In each case the damper 13 also has a piston 24, an end of which extends from the housing 18 to attach to a corresponding upper clamp 9 (the clamps 9 are shown in FIG. 1).

FIG. 3 illustrates detail of the internal parts of the damper 13. When the damper is at rest, most of the piston 24 resides within the housing 18. However, when in use the housing 18 can be forced by backwards movement of the backrest to move along the piston (to the left in the drawing) to expose more of the piston 24. As this happens a spring 25 within the housing, i.e. acting between the housing and piston, is put under tension to retard or cushion backwards movement of the backrest. This tension serves to return the damper housing 18 to its original resting disposition when the force acting against the spring is relaxed.

With further reference to FIG. 3, the damper 13 has an internal stopper 26 at one end of the housing. The arrangement is such that the spring bears against the stopper, but more so when put under tension. The other end of the spring bears against an internal support 27 arranged near the opposite end of the housing 18. The support 27 helps keep the piston 24 and spring 25 in position within the housing. The support 27 moves with the housing to compress the spring between the support and the stopper 26. As also shown, the piston incorporates a pin 28 and it is this that serves to attach the damper to the upper clamp 9 (again, the clamps 9 are shown in FIG. 1).

When in use the housing 18 around the piston 24 moves forwards and backwards in response to bodyweight or muscle driven force from the wheelchair user against the backrest 8. The spring 25 compresses as the piston 24 becomes more exposed, but returns into its original disposition once the force is relaxed. This reduces the stress impact caused by forceful body movements by the seat user. As the housing 18 moves forwards and backwards, the pin 28 is able to move up and down slightly in the associated upper clamp 9, which helps reduce stress on the backrest frame 4.

Referring again to FIG. 2, when the back rest reclines in use, the inner lever arm 15 in each case pivots with respect to the outer lever arm 16. The lever arms 15, 16 are placed at or near the bottom of the backrest support 4 so that at the bottom of the backrest, movement is primarily only a recline motion, i.e. as opposed to the more significant swinging motion at the top of the backrest. This limited movement near the seat base prevents or reduces movement of the occupant's pelvis. This assists in keeping the occupant safely within the seat. In some embodiments the lever arms 15, 16 may have a spring acting between them to help reduce stress on at least the backrest frame 4.

In one aspect of the present teaching, both sides of the back rest 8 are connected to the backrest frame 4 in the same way. The lever arms 16, 17 working in association with the dampers 13 enable the occupant to have a smoother ride and to reduce wear and tear on the wheelchair. Further, when the wheelchair is in use and the weight of the person is shifting forwards and backwards, the backrest 8 moves, automatically, in sympathy with this to a limited extent.

FIG. 4 gives more detail of the relationship between the damper 13 and the backrest 8. In each case the bolts 22 are secured within slots 23 of the L-brackets 11. The piston 24 sits partially within the housing 18 with the pin 28 outside the housing. The spring 25 is shown at rest with the stopper 26 spaced from the support 27.

Referring to FIG. 5, the wheel chair's seat frame 5 has a horizontal bar 29 at each side, and these support a plate like seat base 30. More specifically, the base 30 engages the frame 5 by way of a front saddle 31 at each side, a connector tab 32 at each side, a rear saddle 33 at each side and a clamp 34 at each side. Each tab 32 engages a corresponding one of the clamps 34.

FIG. 6 provides further detail of the way the seat base 30 fits to the frame 5. The clamps 34 are releasably attached to the horizontal bars 29 and the front and rear saddles 31, 33 sit on those bars 29. To facilitate a snug fit, the saddles 31, 33 have a curved recess complimentary to, and that engages, the bars 29. The front saddles 31 can be made of a hard non-metallic synthetic material, for example Nylon, while the rear saddles 33 can be made of a softer more cushioning material such as rubber. The front saddles 31 resist movement of the seat base 30, and the rear saddles 33 are able to resiliently compress under downward force to provide a dampening or cushioning effect with respect to the frame 5 when someone sits on the base 30. Put another way, the rear saddles 33 provide for suspension between the seat base 30 and the seat frame 5.

Still with FIG. 6, each connector tab 32 has an inwardly extending pin 35 that slides into a vertical slot 36 forming part of corresponding seat clamp 34 (the inward extension of the pin 35 is not visible for the tab 32 in the foreground of the drawing). As the pin 35 moves to the bottom of the slot 36 it pushes against a pivoting locking lever 37, displacing it as it passes. The locking lever 37 is weighted to then pivot-return under gravity to its original position blocking the slot 37. This serves to retain the pin 35 in the slot 36, and therefore the seat base 30 with respect to the frame 5. To release the pin 35 from the slot 36, the lever 37 can be pivoted out of the way of the pin 35 by hand, and the pin 35 then raised up out of the slot 36. In each case, when sitting at the bottom of the slot 36, the pin 35 has a little up and down and side to side give, to accommodate compression movement at the rear saddles 33.

FIG. 7 illustrates further detail for the seat base 30 and related parts prior to installation on the seat frame 5.

FIG. 8 illustrates the way the upper clamps 9 engage the backrest frame 4 in more detail. In this regard each clamp 9 has resilient jaws 38 that wrap around one of the uprights 6 and can be tightened by bolts between the jaws (not shown). The clamp 9 incorporates a short-track rail 39 with a slot 40 that receives and retains the pin 28 of the piston (see FIGS. 2 and 3 for the pin 28). While retained in the rail 39, the piston pin 28 can slide up and down a little to provide a little give and reduce occupant body-movement generated strain on the frame 4.

FIG. 9 illustrates detail of how the lower clamps 10 engage with the backrest frame 4. Each clamp 10 has resilient jaws 41 that clip onto a frame upright 6 and may be tightened by a bolt (not shown) between the jaws. The clamp 10 incorporates a short-track rail 42 with an upright slot 43, and a locking lever 44. The arrangement is such that in each case the pin 20 of the outside lever arm 16 (see FIG. 2) slides down into the slot 43. As it does this it pushes against the locking lever 44 causing it to pivot out the way. When the pin is below the lever 44 the lever pivots back under gravity to block the slot 43 and lock in the pin 20. The lever 44 can be subsequently moved out of the way by hand to enable the pin 20 to be released from the clamp 10. If the outer lever arm 16 has two of the pins 20, 21 (see FIG. 2) then they may both be below the locking lever when it closes the slot 43.

In some aspects of the present teaching the dampers 13 may be replaced by spring cushioning lever sets the same or similar to those described above.

In terms of disclosure, this document hereby envisages each item, feature or step mentioned herein, in combination with one or more of any same or other item, feature or step disclosed herein, in each case regardless of whether the combination is claimed.

Non-limiting aspects have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

Having thus described the present teachings, it is now claimed:

1. A wheelchair comprising:

wheels;

a support frame that engages with the wheels;

a seat base fitted to the support frame, wherein the seat base includes at least one rear saddle, at least two connector tabs and at least one front saddle, all engaged with the support frame, wherein each connector tab has a pin that engages a slot of corresponding clamp that is in turn secured to the support frame; and a backrest, wherein the backrest is secured to the frame by way of a set of lever arms at each side, each set comprising one lever arm secured to the back rest (directly or indirectly) and another lever arm secured to the frame (directly or indirectly), for each set at least one of the lever arms is adapted to pivot with respect to the other to enable adjustment of incline of the backrest when an occupant of the seat presses their back against the backrest.

2. A wheelchair according to claim 1, wherein the seat base is detachably fitted to the support frame.

3. A wheelchair according to claim 1, wherein a plurality of clamps are fitted to the support frame, at least some of which have locking levers that pivot to lock the seat base on the support frame.

4. A wheelchair according to claim 1, wherein the front saddle is substantially rigid to limit the movement of the seat base.

5. A wheelchair according to claim 1, wherein the rear saddle is resilient such that at least a rear of the seat base can move up and down on the rear saddle with respect to the support frame.

6. A wheelchair according to claim 1, wherein for each set one of the lever arms is fastened to the backrest by way of a bracket and the other is fastened to the support frame by way of a lower clamp, such that at least one or other of the lever arms is adapted to pivot about a pivot pin with respect to the other.

7. A wheelchair comprising:

wheels;

a support frame that engages with the wheels;

a seat base fitted to the support frame; and a backrest, wherein the backrest is secured to the frame by way of a set of lever arms at each side, each set comprising one lever arm secured to the back rest (directly or indirectly) and another lever arm secured to the frame (directly or indirectly), for each set at least one of the lever arms is adapted to pivot with respect to the other to enable adjustment of incline of the backrest when an occupant of the seat presses their back against the backrest, wherein the backrest is also secured to the support frame (directly or indirectly) by a damper at each side, each damper comprising a piston that retards recline of the backrest to absorb bodyweight or muscle generated wear and tear force on the frame as the backrest moves to a recline position, wherein in each case the damper comprises a housing around the piston, the housing being adapted to move back and forward with respect to the piston when the backrest reclines and subsequently moves to a non-reclined position, wherein in each case the piston comprises a pin outside the housing, arranged such that the pin engages an upper clamp that in turn secures the damper to the support frame.

8. A wheelchair according to claim 7, wherein in each case the damper comprises a spring that tensions when the backrest moves to the recline position to retard the recline.

9. A wheelchair according to claim 7, wherein in each case the piston's pin has been slid into an upwardly opening track.

10. A wheelchair comprising:

a) wheels;

b) a support frame that engages with the wheels;

c) a seat base fitted to the support frame;

d) a backrest, wherein the backrest is secured to the frame by way of a set of lever arms at each side, each set comprising one lever arm secured to the back rest (directly or indirectly) and another lever arm secured to the frame (directly or indirectly), for each set at least one of the lever arms is adapted to pivot with respect to the other to enable adjustment of incline of the backrest when an occupant of the seat presses their back against the backrest;

a) the seat base is detachably fitted to the support frame;

b) a plurality of clamps are fitted to the support frame, at least some of which have locking levers that pivot to lock the base on the support frame;

c) the seat base includes at least one rear saddle, at least two connector tabs and at least one front saddle all engaged with the support frame;

d) each connector tab has a pin that engages a slot of corresponding clamp that is secured to the support frame;

e) the front saddle is substantially rigid to limit the movement of the seat base;

f) the rear saddle is resilient such that the seat base can move up and down on the rear saddle with respect to the support frame;

g) the wheelchair comprises suspension between the frame and the base wherein the base is adapted to move with respect to the frame when a human occupant is seated on the base such that the suspension dampens body weight force between the base and the frame;

h) for each set of lever arms one of the lever arms is fastened to the backrest by way of a bracket and the other is fastened to the support frame by way of a clamp;

i) the backrest is also secured to the support frame (directly or indirectly) by a damper at each side, each damper comprising a piston that retards recline of the backrest to absorb bodyweight or muscle generated wear and tear force on the support frame as the backrest moves to a recline position;

j) in each case the damper comprises a spring that tensions when the backrest moves to the recline position to retard the recline;

k) in each case the damper comprises a housing around the piston, the housing being adapted to move back and forward with respect to the piston when the backrest reclines and subsequently moves to a non-reclined position;

l) in each case the piston comprises a pin outside the housing, and the pin engages a clamp that secures the damper to the support frame; and m) in each case the piston's pin has been slid into an upwardly opening track.

11. A wheelchair according to claim 1, comprising suspension between the frame and base, characterised in that the base is adapted to move with respect to the frame when a human occupant is seated on the base such that the suspension dampens body weight force between the base and frame.

* * * * *